Oct. 22, 1929.  H. F. BERGSTRESSER  1,732,786
DISPENSING DEVICE
Filed April 28, 1927
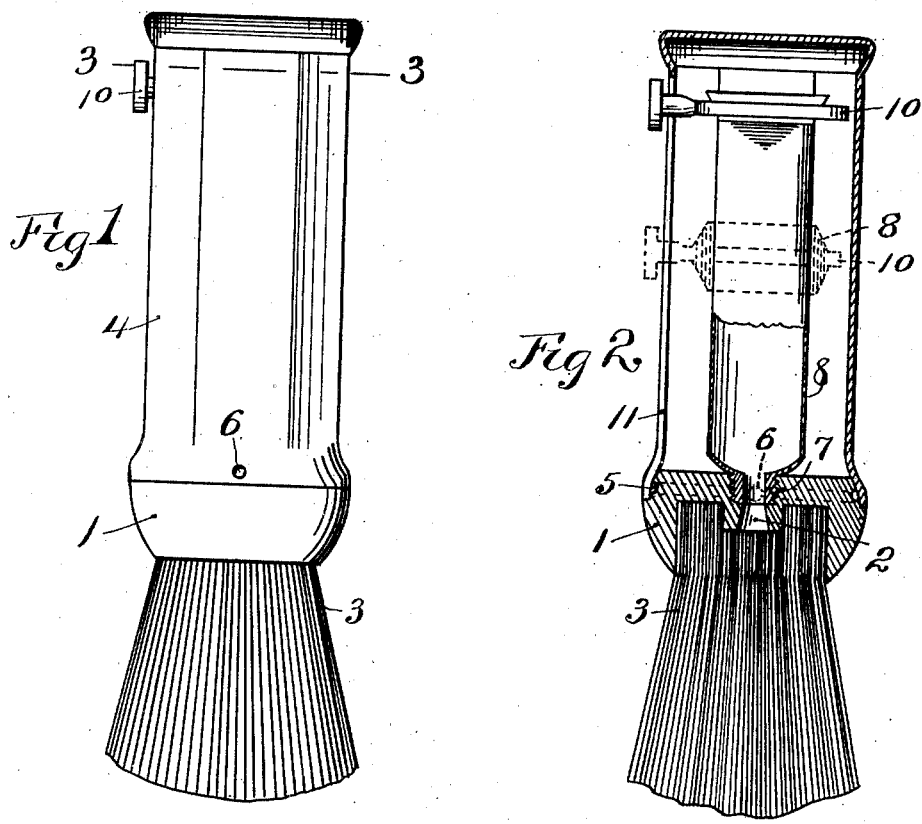
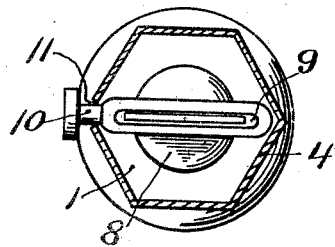
Witness
H. J. Olson
INVENTOR.
Harold F. Bergstresser,
BY Warren D. House,
His ATTORNEY.

Patented Oct. 22, 1929

1,732,786

UNITED STATES PATENT OFFICE

HAROLD F. BERGSTRESSER, OF LAWRENCE, KANSAS

DISPENSING DEVICE

Application filed April 28, 1927. Serial No. 187,203.

My invention relates to improvements in dispensing devices. It is particularly well adapted for use in connection with brushes, such as are used for shaving, painting, blacking or cleaning.

One of the objects of my invention is to provide novel means for expressing liquid or paste contents from a collapsible container, such as a tube containing, shaving cream, tooth paste, paint or blacking.

A further object of my invention is to provide a novel brush having simple and efficient means for supplying the bristles thereof with liquid or paste carried by the brush as the latter is to be used.

A further object of my invention is to provide a device of the kind which is simple, cheap, durable, strong, not likely to get out of order, which is easy to use, and which may readily be supplied with new material to be used when the old material carried thereby becomes exhausted.

The novel features of my invention are hereinafter fully described and claimed.

In the accompanying drawing, which illustrates the preferred embodiment of my invention, Fig. 1 is a side elevation of a brush embodying my improvement.

Fig. 2 is a vertical central sectional view of the same.

Fig. 3 is a section on the line 3—3 of Fig. 1.

Similar reference characters designate similar parts in the different views.

1 designates a holder having a central threaded discharge opening 2 disposed so as to discharge into bristles 3 mounted in the bottom of the holder.

4 designates a tubular polygonal handle having an open lower end adapted to be removably fitted on the shouldered upper end of the holder 1, the latter having means for releasable engagement with the handle, which may comprise an annular peripheral groove 5 adapted to receive two oppositely disposed depressions 6 in the handle 4.

The handle is composed of material sufficiently resilient to permit the open end to be expanded to enable the depressed portions 6 to be slipped into the groove 5.

The handle 4 is adapted to receive therein a collapsible container, such as a lead or tin tube, one end of which has a threaded nozzle 7 adapted to be removably fitted in the discharge opening 2. The container, which is designated by 8, has its other end flattened and adapted for insertion into a slot 9 which is provided in a transverse operating member 10, which has one end extending through and rotatable and slidable in a slot 11 which extends longitudinally into one corner of the handle 4 from the open end thereof.

By rotating the member 10, the container 8 will be wound thereon to form a roll, as shown in dotted lines in Fig. 2, thereby collapsing the container and causing a portion of the contents thereof to be expressed through the nozzle 7 and the opening 2 into the bristles 3.

In order to guide the other end of the operating member 10, the handle 4, excepting at its ends, is polygonal, the handle shown being hexagonal. The member 10 is disposed with one end in and adapted to be guided by one corner of the handle, as shown, and the slot 11 is disposed in the opposite corner of the handle.

In the operation of the invention, the handle 4 is removed from the holder 1. The container 8 then has its nozzle 7 screwed into the opening 2. The operating member 10 may be mounted on the container and sold therewith, or it may be applied thereon by the person having the brush. After the member 10 is mounted on the flat end of the container, the handle 4 is slipped onto the holder 1 and the projecting portion of the operating member 10 is slipped into the slot 11, as shown in solid lines in Fig. 2. By having the slot 11 extend clear to the open end of the handle, a collapsible container having already mounted thereon an operating member 10, may be slipped into the handle without removing the operating member, which may be slipped into the open end of the slot. The slot 11 thus performs a double function, that of permitting the insertion of the operating key while it is attached to the container, and of permitting the handle to expand at its open end so that the projection 6 can enter the endless groove 5. By providing an endless groove 5 for receiving the projection 6, the handle may be slipped onto the holder in any circumferential position of the handle, thus enabling the container, with the key attached thereto to be screwed into the holder opening 2, and the handle then slipped over the holder and the key and held locked by the projection 6 entering the groove 5.

When the brush is to be used, the operating member is rotated in the slot 11, thereby winding thereon a portion of the container 8, thus collapsing the portion so wound and causing some of the contents to be expressed through the nozzle 7 and discharge opening 2 into the bristles.

As the brush is used from time to time and the container wound on the operating member 10, the collapsed portion of the container will form a roll, as shown in dotted lines in Fig. 2.

When the contents have been discharged from the container, the handle 4 is removed and the container unscrewed from the holder 1. A new container may then be substituted for the one removed.

I do not limit my invention to the structure shown and described, as many modifications, within the scope of the appended claim, may be made without departing from the spirit of my invention.

What I claim is:—

In a dispenser of the kind described, a holder having a central threaded discharge opening adapted to have fitted therein a threaded nozzle of a collapsible container, said holder having an endless peripheral groove concentric with and in a plane transverse to said opening, and a tubular handle having a resilient open end and a slot extending longitudinally from said open end and adapted to receive a key for winding said container, said handle having an inwardly extending projection adapted to enter said groove, said slot permitting said open end to be expanded and slipped onto said holder in any circumferential position of the handle with said projection entering said groove.

In testimony whereof I have signed my name to this specification.

HAROLD F. BERGSTRESSER.